(12) United States Patent  
Nakamura

(10) Patent No.: US 6,204,626 B1
(45) Date of Patent: Mar. 20, 2001

(54) DRIVING METHOD AND DRIVING DEVICE FOR MOTOR

(75) Inventor: Masayuki Nakamura, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/359,933

(22) Filed: Jul. 22, 1999

(30) Foreign Application Priority Data

Aug. 28, 1998 (JP) .................................................. 10-243955

(51) Int. Cl.⁷ ...................................................... H02P 5/28
(52) U.S. Cl. ........................ 318/700; 318/705; 318/712; 318/714; 310/156
(58) Field of Search ............................. 310/156; 318/138, 318/254, 439, 701, 700, 705, 712, 714

(56) References Cited

U.S. PATENT DOCUMENTS 3,999,108 * 12/1976 Tanikoshi .............................. 318/138
4,743,825 * 5/1988 Nashiki ................................. 318/723
6,034,460 * 5/2000 Tajima et al. ......................... 310/179

FOREIGN PATENT DOCUMENTS 62-141998 6/1987 (JP) .
8-331884 12/1996 (JP) .

* cited by examiner

Primary Examiner—Robert E. Nappi
Assistant Examiner—Rita Leykin
(74) Attorney, Agent, or Firm—Kenyon & Kenyon

(57) ABSTRACT

A device and method for driving a concentrated winding synchronous motor which, upon supply of a given electric current to a stator coil of the motor, generates an increased torque. Periodical corrections are executed to the waveform of the current to be supplied to the coils of each phase of the stator and corrections are executed to decrease the alternating current supplied to the coil of any tooth at which a portion of a magnetic field generated, with respect to the pole of the closest rotor, is in a direction reverse to a rotation of the rotor.

9 Claims, 6 Drawing Sheets

DRIVING METHOD AND DRIVING DEVICE FOR MOTOR

INCORPORATION BY REFERENCE

The disclosure of Japanese Patent Application No. HEI 10-243955 filed on Aug. 28, 1998 including the specification, drawings and abstract is incorporated herein by reference in its entirety.

BACKGROUND OF THE INVENTION

1. Field of the Invention

The present invention relates generally to a driving method and a driving device for a motor, and more particularly, to a driving method and a driving device for a concentrated winding synchronous motor.

2. Description of the Related Art

FIGS. 5A, 5B and 5C illustrate partially sectional views of a concentrated winding synchronous motor. Referring to the drawings, a rotor 32 shown in FIG. 5B has been rotated counterclockwise at 7.5 from the state of the rotor shown in FIG. 5A as a reference, and the rotor 32 shown in FIG. 5C has been rotated counterclockwise at 15 from the reference state shown in FIG. 5A.

In the concentrated winding synchronous motor shown in the drawings, a stator 35 having a plurality of teeth 34a through 34f is fitted inside a cylindrical case 30. In the case of the motor shown in the drawings, the coil of the stator 35 is of the concentrated winding type, and each of the teeth 34 is wound with a coil of either phase U, V, or W.

The rotor 32 is pivotally supported inside the stator 35. Radially magnetized permanent magnets are attached to the outer surface of the rotor 32. These permanent magnets function as magnetic poles 36a through 36d of the rotor 32. In this type of motor, three phase alternating current is supplied to the coils of the teeth 34 to form a rotating magnetic field in the stator 35, and the repeated cycle of attraction and repulsion between the respective magnetic poles 36 and the teeth 34 serves to drive the rotor 32 at a predetermined torque.

Adoption of such concentrated winding can simplify the manufacturing process of the synchronous motor owing to the easy installation of the coil compared with the distributed winding (wrapping) in which the coil is applied to wind about one or more teeth 34.

However, applying the coil of concentrated winding type to the teeth 34 may fail to efficiently obtain the required torque.

FIG. 6 illustrates how the aforementioned problem arises. The upper side of FIG. 6A shows the portion interposed between the magnetic poles 36b, 36c and the teeth 34b through 34e opposite thereto in a rotating direction in FIG. 5A. The lower side of FIG. 6A shows the magnetic field formed by the stator 35 at the position of the rotor 32. FIGS. 6B and 6C likewise show each of the portions interposed between the magnetic poles 36b, 36c and the teeth 34b through 34e opposite thereto illustrated in FIGS. 5B and 5C, and the magnetic field formed by the stator 35 at the position of the rotor 32.

As indicated in FIG. 6A, the S pole magnetic field (inward magnetic field) formed by the tooth 34b and the N pole magnetic field (outward magnetic field) formed by the tooth 34c coexist separately left and right on the surface facing the magnetic pole 36b. Similarly the N pole magnetic field formed by the tooth 34c and the S pole magnetic field formed by the tooth 34e coexist left and right on the surface facing the magnetic pole 36c. Therefore, when the rotor 32 is at the position illustrated in FIG. 6A or FIG. 5A, the magnetic poles 36b and 36c are attracted by the respective destination teeth 34c and 34e as well as being repelled by the respective teeth 34b and 34c behind thereof, thereby enabling the rotor 32 to generate torque efficiently.

In the state shown in FIG. 6C, the magnetic poles 36b and 36c are likewise attracted by the respective destination teeth 34d and 34e as well as being repelled by the respective teeth 34b and 34d behind thereof, thereby enabling the rotor 32 to generate the torque efficiently.

However, a state shown in FIG. 6B exists in the process proceeding from the state of FIG. 6A to that of FIG. 6C. That is, since the current supplied to each phase has a sinusoidal wave, the generated N pole magnetic field opposing the magnetic pole 36b becomes relatively weak compared with the state shown in FIG. 6A, and the generated N magnetic field opposing the magnetic pole 36c becomes relatively strong as compared with the state shown in FIG. 6A. In this state, a part of the magnetic fields formed on the surface facing the magnetic poles 36b and 36c may fail to contribute to generation of the torque, and act to reduce the torque generated. In the case of the magnetic pole 36b, as shown by arrow A in FIG. 6B, a portion of N pole magnetic field generated by the tooth 34c exists behind a centerline 38b of the magnetic pole 36b, that is, at the side reverse to the rotating direction. Therefore the magnetic pole 36b is pulled back in a direction reverse to the rotating direction. The aforementioned phenomenon applies to the magnetic pole 36c. As indicated by arrow B in FIG. 6B, a portion of the N pole magnetic field generated by the tooth 34d exists at a forward side, in the rotating direction, of a centerline 38c of the magnetic pole 36c. This may push back the magnetic pole 36c in a direction reverse to the rotating direction.

Accordingly, when adopting the concentrated winding for the synchronous motor coil, depending on the position of the rotating rotor 32, a portion of each phase current supplied to the coil of the stator 35 of the synchronous motor may serve to impede generation of torque. As a result, the rotating torque is not efficiently obtained.

SUMMARY OF THE INVENTION

The present invention has been made in view of the aforementioned drawbacks, and it is the object of the present invention to provide a motor driving method and a motor driving device capable of generating a larger torque upon the supply of the same electric current to the stator coil of the concentrated winding synchronous motor.

Therefore, in the present invention, a correction is executed by decreasing the alternating current supplied to the coil wound around the teeth if a portion of the magnetic field generated by the teeth of the stator produces magnetism in a direction opposite of a direction of rotation of a rotor with respect to the pole of the closest rotor. When using the electric current supplied to the coil so as to impede generation of the torque, the amount of current supplied is limited to improve torque generating efficiency.

The present invention also executes a correction by decreasing the alternating current supplied to the coil of a first tooth for a predetermined first period included in the time taken for a pole of the rotor to move from a position opposing the first tooth of the stator to a bridge portion between the first tooth and an adjacent second tooth. It may also execute a correction by decreasing the alternating current to be supplied to the coil of a second tooth for a predetermined second period included in the time taken for the pole of the rotor to move from the bridge portion between the first tooth and the adjacent second tooth of the stator to a position opposing the second tooth. In this way, the current is supplied to the coil of the first tooth for a predetermined period, thus impeding generation of the torque. By limiting the supply of such current, the torque generating efficiency can be improved.

DESCRIPTION OF THE PREFERRED EMBODIMENT

Preferred embodiment of the present invention will be described in detail with reference to the drawings.

Figure 1:
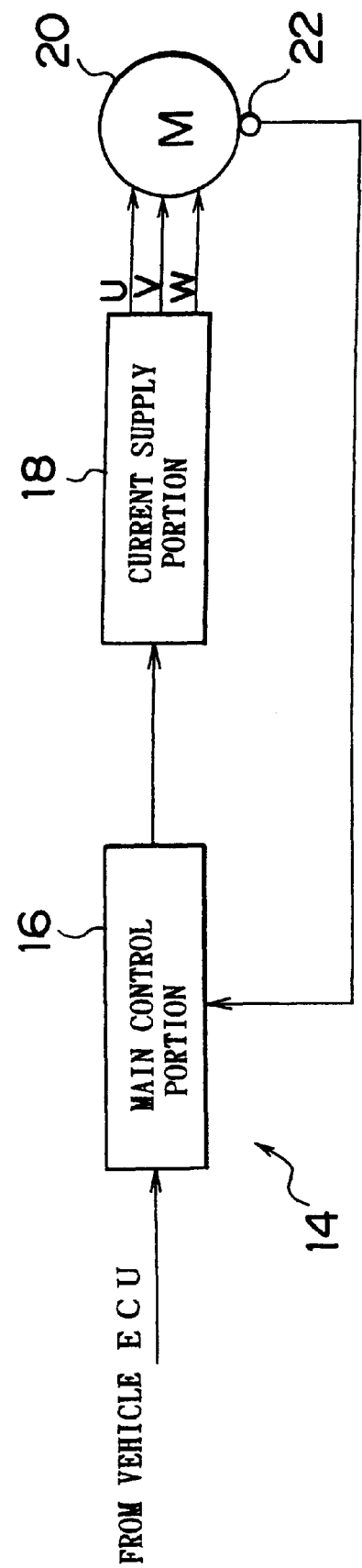
FIG. 1 is a block diagram illustrating the structure of a motor driving device according to an embodiment of the present invention.
Figure 5A:
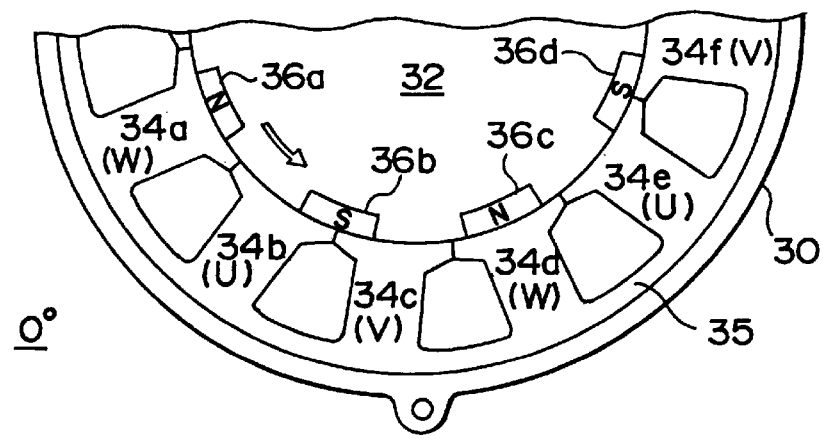
FIG. 5 is a sectional view of the concentrated winding synchronous motor at the respective state.
Figure 5B:
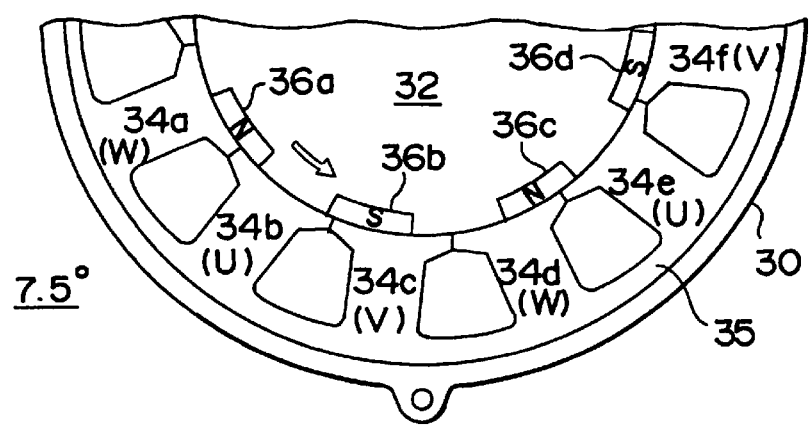
Figure 5C:
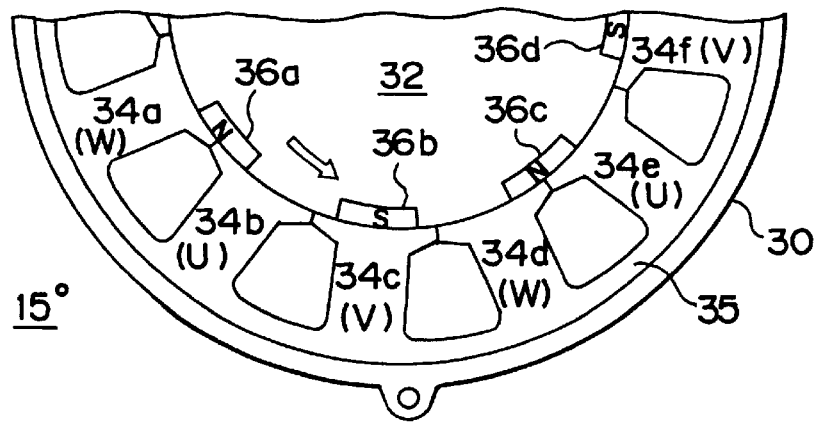
Figure 6A:
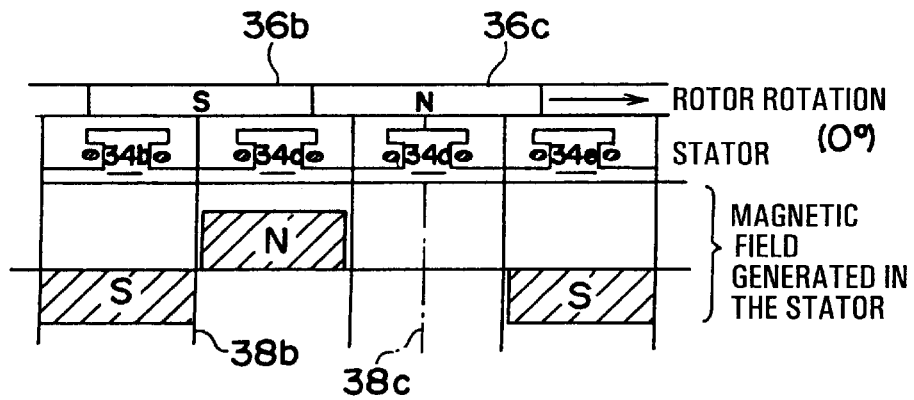
FIG. 6 illustrates each magnetic field generated at the stator of the concentrated winding synchronous motor shown in FIG. 5.
Figure 6B:
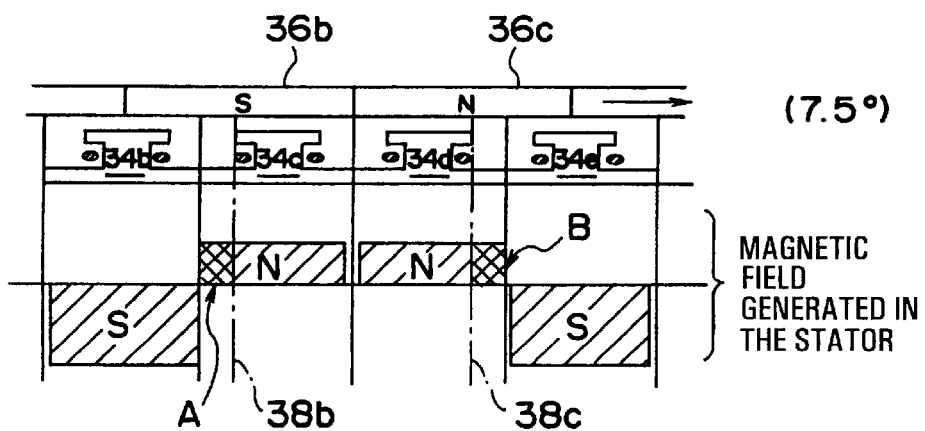
Figure 6C:
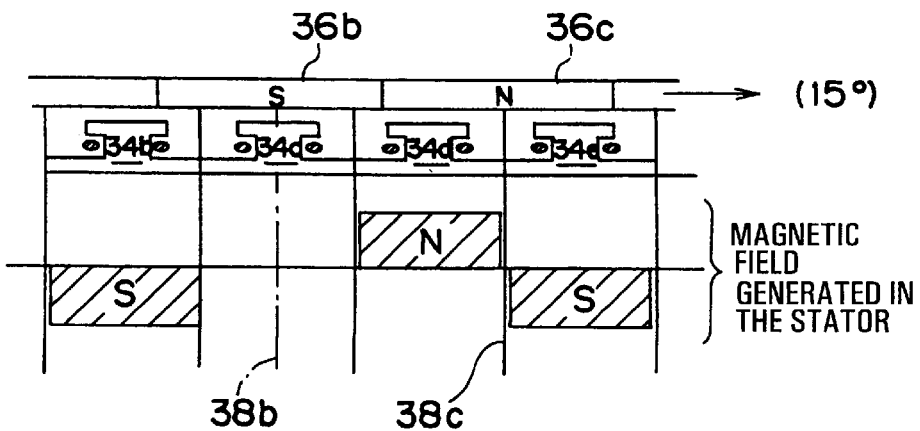

FIG. 1 shows the structure of the motor driving device according to an embodiment of the present invention A motor drive device 14 shown in FIG. 1 is mounted on an electric vehicle, and a three phase alternating current with the corrected waveform in accordance with the present invention is supplied to a concentrated winding synchronous motor 20 from a current supply portion 18. The concentrated winding synchronous motor 20 is provided with eight poles and twelve teeth, which is the same as the motor shown in FIGS. 5 and 6. Therefore, the same reference numerals as in FIGS. 5 and 6 will be used for the description hereinafter. Furthermore, the current supply portion 18 is formed of a DC power source, an inverter and a PWM (Pulse Width Modulation) control circuit (not shown).

The motor driving device 14 further includes a main control portion 16. The main control portion 16 is formed of a CPU and a memory. Operational information including revolutions of the motor 20, vehicle weight, accelerator operating degree is input from a vehicle ECU (Electronic Control Unit), and the rotational position of the rotor 32 is input from a rotor position detector 22 installed in the motor 20. The current waveform supplied to the motor 20 is determined by the main control portion 16 in accordance with the aforementioned input information. Furthermore, each phase current value output from the current supply portion 18 may be fed back to the main control portion 16 for stable motor control.

Figure 2A:
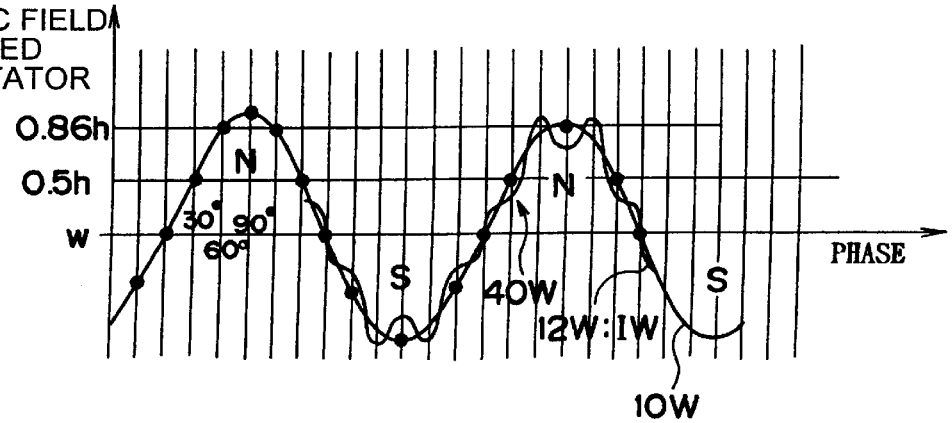
FIG. 2 shows the waveform of the respective phase current supplied to a concentrated winding synchronous motor of the motor driving device according to the embodiment of the present invention.
Figure 2B:
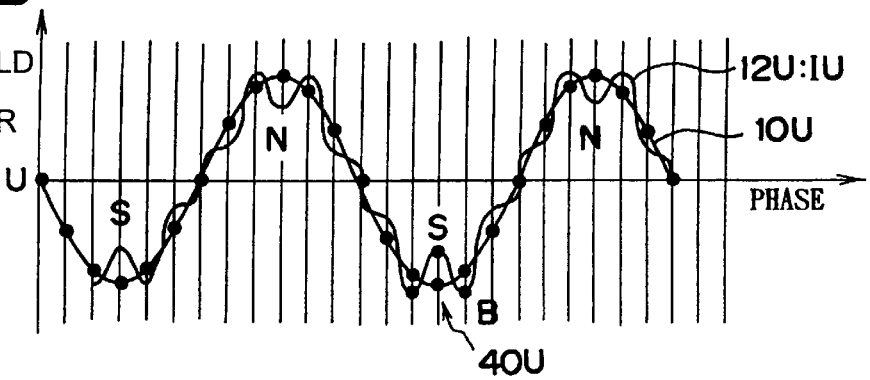
Figure 2C:
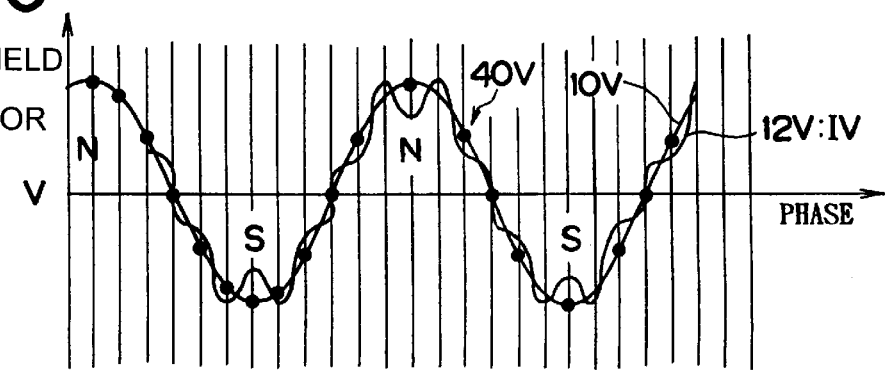

FIG. 2 illustrates an example of each waveform supplied from the current supply portion 18 to the coil of the stator 35 of the motor 20 for each phase. Specifically, FIG. 2A shows a W-phase current waveform, FIG. 2B shows an U-phase current waveform, and FIG. 2C shows a V-phase current waveform.

In FIGS. 2A, 2B and 2C, the axis of abscissa represents the current phase, and the axis of ordinates represents the magnetic field generated in the stator 35 of the motor 20. In the drawings, the N pole magnetic field (magnetic field in the direction of the rotor 32) is generated in the positive range of the axis of ordinates, and the S pole magnetic field is generated in the negative range.

In FIGS. 2A, 2B and 2C, relatively thick lines 10U, 10V and 10W indicate the reference current waveforms. Meanwhile, relatively thin lines 12U, 12V and 12W indicate the corrected current waveforms IU, IV and IW, which can be expressed by the following equations (1) through (3), respectively.

$$IU = I \times \alpha \times \beta U \times sin(\theta) \tag{1}$$

$$IV = I \times \alpha \times \beta V \times sin(\theta + \pi/3) \tag{2}$$

$$IW = I \times \alpha \times \beta W \times sin(\theta + 2\pi/3) \tag{3}$$

In the above equations, the corrected current waveforms IU, IV and IW are determined such that the sum of each instantaneous value thereof becomes 0. In the equations, I denotes the amplitude of the reference current waveform, and βU, βV and βW denote correction coefficients of each phase, α denotes the amplitude of the correction coefficient βU, βV, and βW, i.e., thecorrectedamplitude. Each cycle of the correction coefficients βU, βV and β W is 6 times that of the reference current waveform as shown in the drawings. A table is stored in the memory (not shown) of the main control portion 16.

Using the corrected current waveforms IU, IV and IW shown in the drawings allows the motor 20 to improve the torque generation efficiency. For example, the timings at which the rotor 32 of the motor 20 comes to the position shown in FIGS. 5B and 6B correspond to the timings indicated by the arrows 40U, 40V and 40W shown in FIG. 2. In these cases, especially as indicated by the arrow 40V, a current less than the reference current is supplied to the coil wound around the tooth 34c (V-phase) as a corrected current. This reduces the degree to which the magnetic field generated by the tooth 34c impedes the generation of torque, thus improving the torque generation efficiency. At this timing, the current value of the W-phase indicated by the arrow 40W is likewise corrected to a decreased level, which weakens the influence of the tooth 34d on impeding generation of the torque. Meanwhile, the current value of the U-phase indicated by the arrow 40U is corrected to an increased level such that the sum of the instantaneous values of the respective phase currents becomes 0.

Figure 3:
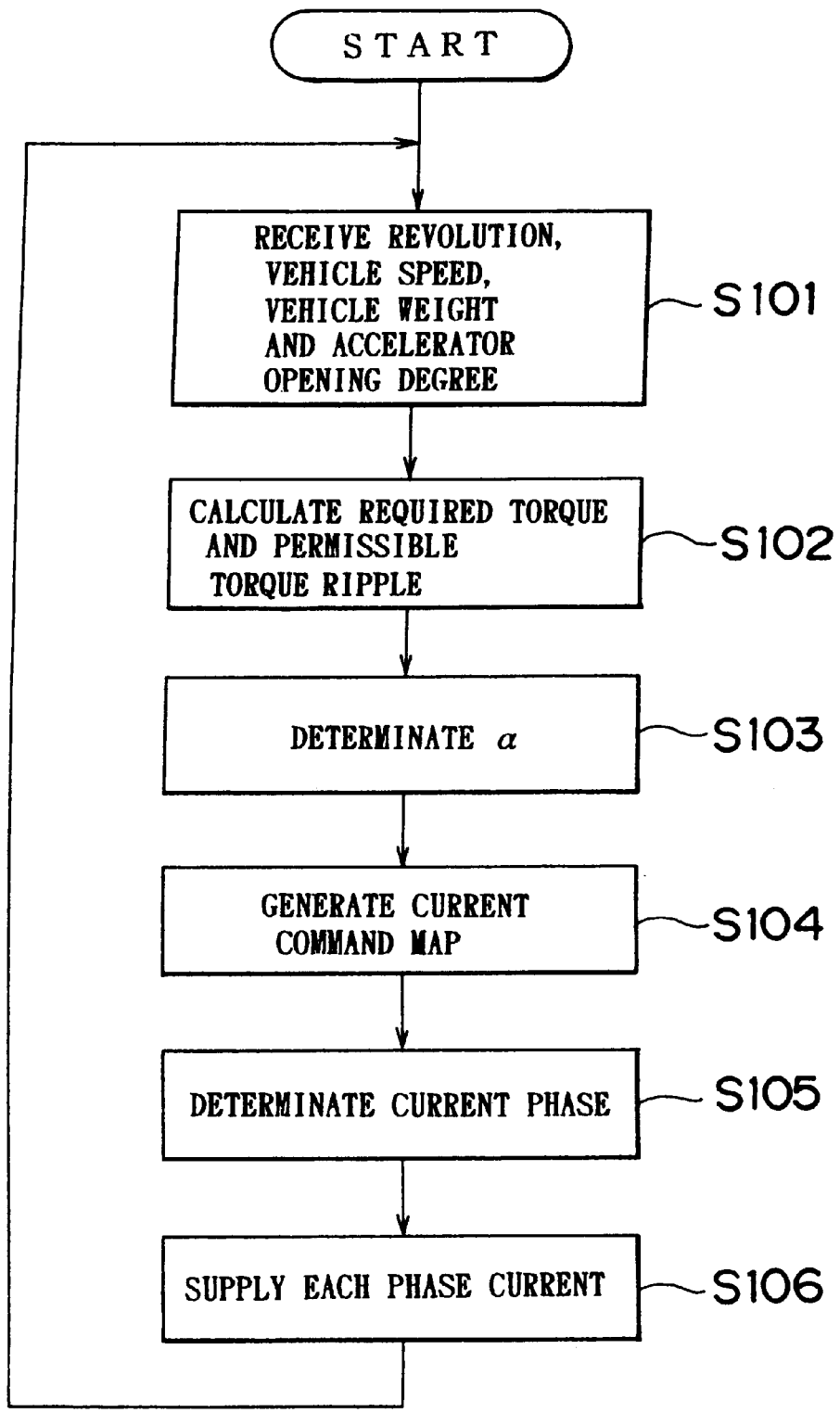
FIG. 3 is a flowchart representing an operation of the motor driving device according to the embodiment of the present invention.

FIG. 3 is a flow chart representing the operation of the motor driving device 14 according to the embodiment of the present invention. Referring to the drawing, in the motor drive device 14, the vehicle ECU of the main control portion 16 receives the operational information including the revolutions of the motor 20, vehicle speed, vehicle weight, accelerator opening degree or the like (S101). Then, the main control portion 16 calculates the required torque and the permissible torque ripple in accordance with the input information (S102), and the correction amplitude a is determined in accordance with the required torque and the permissible torque ripple (S103).

Figure 4:
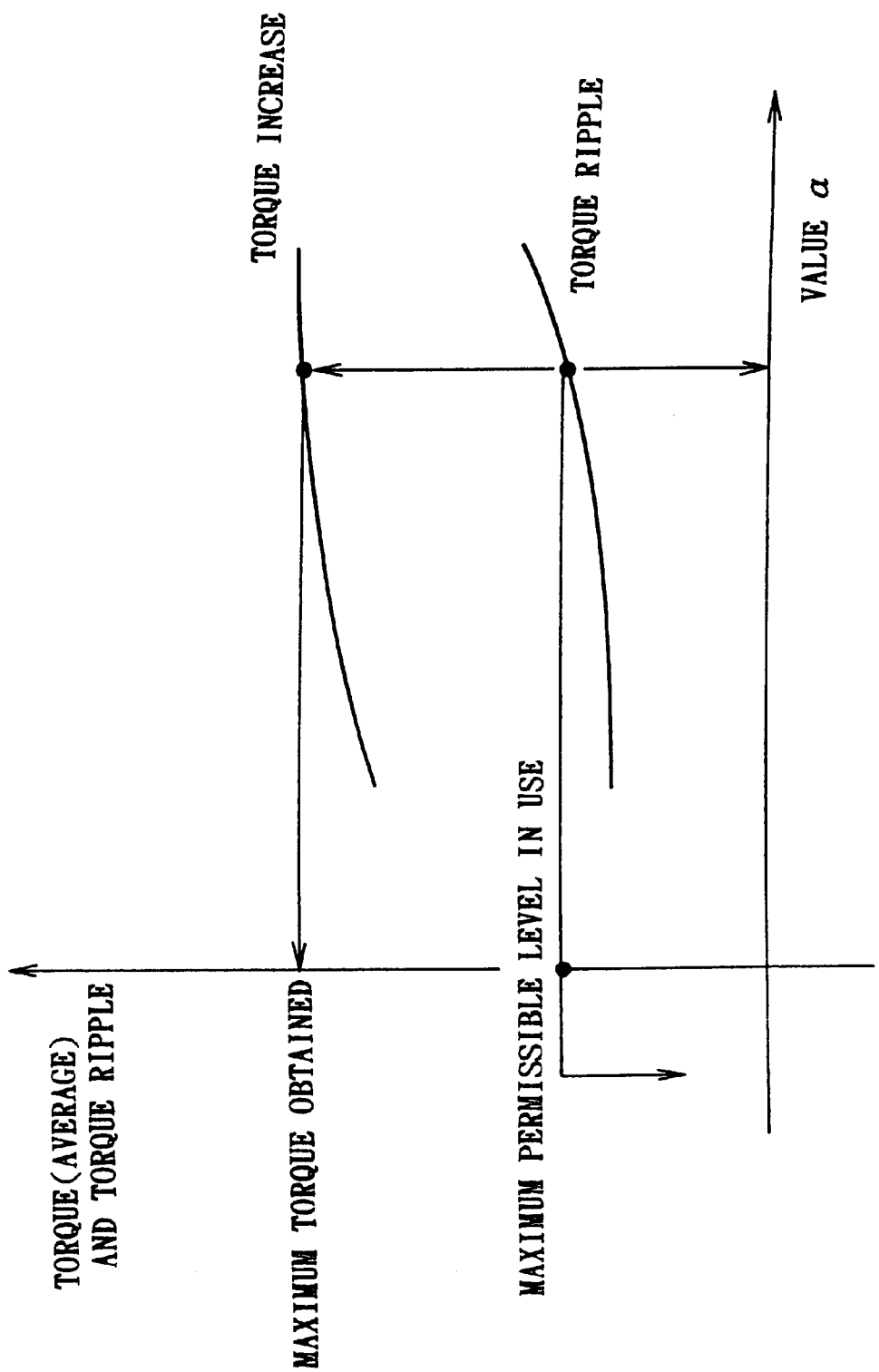
FIG. 4 is a graphical representation showing a relationship of the degree of correction applied to the current waveform with respect to the torque ripple and torque increase amount, respectively.

That is, the torque ripple will increase upon supply of the current with the waveform shown in FIG. 2 to the motor 20. Leaving the torque ripple increasing, however, may deteriorate the driving feel of the electric vehicle. FIG. 4 is a graphical representation of the relationship of the value of the correction amplitude α with respect to the torque ripple and the torque increase amount. As shown in the figure, the torque can be increased for the same input by increasing the correction coefficient α. At the same time, however, this may increase the torque ripple. For this reason, the motor driving device 14 of the present invention is designed to determine as to what extent the deterioration of the driving feel is permissible based on the vehicle weight and vehicle speed, and calculate the correction coefficient α in accordance with the permissible value.

Next, in the motor driving device 14, the main control portion 16 calculates the current waveforms IU, IV and IW of each phase as shown in FIG. 2 to generate a current command value map (S104). Further, the main control portion 16 determines the current phase to be supplied to the motor 20 based on the output from the rotor position detector 22 installed in the motor 20 (S105). Based on the results of the aforementioned processing, control signals are sent to the current supply portion 18 to supply current to the motor 20 (S106).

According to the motor driving device 14 described above, the degree of contribution of a coil of a phase of the stator 35 to the torque is focused. In the case where the relative position of the rotor 32 and the stator 35 may cause an adverse effect on torque generation, the current amount of the phase is limited. On the other hand, in the case where the relative position may be advantageous for torque generation, the current amount of the phase is increased. This may prevent the increase in the amount of the heat generated by the inverter employed in the current supply portion 18 by maintaining supply of the average current to the motor 20, yet improving the torque.

What we claim is:

1. A method of driving a concentrated winding synchronous motor including a stator having a plurality of teeth, a first coil wound around a first tooth in a first phase, a second coil wound around a second tooth adjacent to the first tooth in a second phase and a rotor having a plurality of magnetic poles, the method comprising the steps of:

correcting an amount of alternating current to be supplied to the first and second coils with respect to a reference alternating current for each phase so that, when the magnetic field produced by the first tooth is generated in a direction opposite to a direction of rotation of the rotor with respect to the closest pole of the rotor, the current supplied to the first coil is decreased to be smaller than the reference alternating current for the first phase for a predetermined first time period determined based on a time required for a first one of the poles of the rotor to move from a position opposing the first tooth to a position overlapping at least a portion of the first tooth and the adjacent second tooth, and the current supplied to the second coil of the second tooth is decreased to be smaller than the reference alternating current for the second phase for a predetermined second time period determined based on a time required for the first pole to move from the position overlapping the first and second teeth to a position opposing only the second tooth; and supplying the corrected alternating current to the coils.

2. The method according to claim 1, wherein the step of correcting the alternating current includes the substep of decreasing the current supplied to the second coil of the second tooth to be smaller than the reference alternating current for the second phase for a predetermined third time period determined based on a time required for a first one of the poles of the rotor to move from a position overlapping the first and second teeth to a position opposing only the second tooth.

3. The method according to claim 2, wherein the step of correcting the alternating current includes the substep of increasing the alternating current supplied to the first coil of the first tooth to be larger than the reference alternating current for the first phase for the predetermined third time period.

4. The method according to claim 3, wherein the alternating current decreased by the correction and supplied to the coil of the second tooth, and the alternating current increased by the correction and supplied to the coil of the first tooth are determined such that the sum of each instantaneous value of the alternating current supplied to each phase becomes 0.

5. The method according to claim 1, wherein the correction is executed by decreasing the alternating current to be supplied to the coil wound around the teeth using a predetermined coefficient derived from the relationship between a torque ripple and an increased amount of torque generated by the motor.

6. A device for driving a concentrated winding synchronous motor comprising:

a motor including a stator and rotor, wherein the stator includes a first coil wound around a first tooth formed on the stator in a first phase and a second coil wound around a second tooth formed on the stator adjacent to the first tooth in a second phase, and a magnet is provided on the rotor;

a current supply device for supplying an alternating current to each of the first coil and the second coil; and a current regulating device for correcting an amount of alternating current supplied to the first and second coils with respect to a reference alternating current for each phase so that, when the magnetic field produced by the first tooth is generated in a direction opposite to a direction of rotation of a rotor with respect to the closest pole of the rotor, the alternating current supplied to the first coil is decreased to be smaller than the reference alternating current for the first phase for a predetermined first time period based on an amount of time required for a pole of the rotor to move from a position opposing the first tooth to a position opposing a bridge portion between the first and second teeth.

7. A device according to claim 6, wherein the correction is executed by decreasing the alternating current supplied to the second coil to be smaller than the reference alternating current for the second phase for a predetermined second time period based on a time required for the pole of the rotor to move from the position opposing the bridge portion between the first and second teeth to a position opposing the second tooth.

8. A device according to claim 6, wherein the correction is executed by decreasing the alternating current supplied to the second coil to be smaller than the reference alternating current for the second phase for a predetermined third time period based on a time required for a pole of the rotor to move from a position opposing a bridge portion between the first and second teeth to a position opposing the second tooth.

9. A device according to claim 8, wherein the corrected decreased alternating current supplied to the second coil, and a corrected increased alternating current supplied to the first coil are determined such that a sum of instantaneous values of these alternating currents becomes 0.

* * * * *